US009451092B2

(12) United States Patent
Qureshi

(10) Patent No.: US 9,451,092 B2
(45) Date of Patent: Sep. 20, 2016

(54) MOBILE DEVICE MESSAGING APPLICATION

(71) Applicant: Rick Qureshi, San Francisco, CA (US)

(72) Inventor: Rick Qureshi, San Francisco, CA (US)

( * ) Notice: Subject to any disclaimer, the term of this patent is extended or adjusted under 35 U.S.C. 154(b) by 509 days.

(21) Appl. No.: 14/065,313

(22) Filed: Oct. 28, 2013

(65) Prior Publication Data

US 2014/0051402 A1 Feb. 20, 2014

Related U.S. Application Data

(63) Continuation-in-part of application No. 12/696,946, filed on Jan. 29, 2010, now Pat. No. 8,572,493.

(60) Provisional application No. 61/148,351, filed on Jan. 29, 2009.

(51) Int. Cl.
| | |
|---|---|
| *H04M 3/53* | (2006.01) |
| *H04W 8/20* | (2009.01) |
| *G06F 3/0488* | (2013.01) |
| *G06Q 30/02* | (2012.01) |
| *H04L 12/58* | (2006.01) |
| *G06Q 30/06* | (2012.01) |

(52) U.S. Cl.
CPC .......... *H04M 3/5307* (2013.01); *G06F 3/0488* (2013.01); *H04L 12/588* (2013.01); *H04L 12/5895* (2013.01); *H04L 51/20* (2013.01); *H04L 51/32* (2013.01); *H04L 51/38* (2013.01); *H04W 8/205* (2013.01); *G06Q 30/02* (2013.01); *G06Q 30/0251* (2013.01); *G06Q 30/0255* (2013.01); *G06Q 30/0601* (2013.01); *H04L 12/58* (2013.01); *H04L 12/581* (2013.01); *H04L 51/04* (2013.01)

(58) Field of Classification Search
CPC ..................................................... H04W 4/206
See application file for complete search history.

(56) References Cited

U.S. PATENT DOCUMENTS

| | | | | |
|---|---|---|---|---|
| 2003/0167324 A1* | 9/2003 | Farnham | ............... | G06F 3/0481 709/224 |
| 2004/0215793 A1* | 10/2004 | Ryan | ...................... | G06Q 50/01 709/229 |
| 2005/0143108 A1* | 6/2005 | Seo | ........................ | G06F 17/211 455/466 |
| 2007/0150368 A1* | 6/2007 | Arora | ..................... | G06Q 30/02 705/26.1 |
| 2007/0255807 A1* | 11/2007 | Hayashi | .................. | H04L 12/58 709/219 |
| 2008/0059570 A1* | 3/2008 | Bill | ........................ | G06Q 10/10 709/203 |
| 2008/0208812 A1* | 8/2008 | Quoc | ..................... | G06Q 10/10 |

* cited by examiner

*Primary Examiner* — Jeffrey A Gaffin
*Assistant Examiner* — John M Heffington
(74) *Attorney, Agent, or Firm* — Ray K. Shahani

(57) ABSTRACT

A social networking mobile software application for particular mobile devices which allow end users on their mobile devices to view profiles of themselves that contain images and/or videos while simultaneously hearing audio description of their ad via wireless connection to the internet and/or cellular provider data network using streaming or intact multimedia file.

21 Claims, 21 Drawing Sheets

Reset color

Erase this color setting

MOBILE DEVICE MESSAGING APPLICATION

RELATED APPLICATIONS

The present application is a Continuation-In-Part application of pending U.S. patent application Ser. No. 12/696,946 filed Jan. 29, 2010, entitled "MOBILE DEVICE MESSAGING APPLICATION", U.S. Pat. No. 8,572,493 scheduled to be issued on Oct. 29, 2013, which is a Non-provisional application and related to U.S. Provisional Patent Application Ser. No. 61/148,351 filed Jan. 29, 2009 entitled MOBILE DEVICE MESSAGING APPLICATION, which are both incorporated herein by reference in their entirety, and claims any and all benefits to which it is entitled therefrom.

FIELD OF THE INVENTION

The present invention relates to accessing audio and video content concurrently with text and images for mobile, handheld cellular devices and systems and methods for delivery to end-users.

BACKGROUND OF THE INVENTION

In approximately year 2000 companies started introducing the ability to send voice message as an attachment in an email. However, it was limited only to specific known email addresses, not in response to social network profiles, such as Facebook, MySpace, Twitter, etc., which offer some degree of anonymity where the user may only be known by an avatar or alias.

Online social networks allow voice and video uploads but they didn't have a seamless way of doing it from a handheld device over a cellular network such as a Smartphone. Additionally the video or audio files had to be recorded by another application, after which the user would have to log in to the social network using a browser and upload the file.

Other applications running on a handheld device that operate on Wi-Fi and cellular data networks allow uploading recorded audio and video to social networks but they didn't allow you to view profiles, record an audio or video response and upload it at the time the provisional application was filed.

Other social networking applications such as Twittelator and Twit Bird that run on mobile handheld devices exist today that allow you to record audio/video and respond to a profile but they don't allow you to select a color to display messages from a specific user in. And further they do not allow the color to be selected by mixing a combination of red, green and blue primary colors.

Other social networking applications that run on mobile handheld devices exist today that allow you to record audio/video and respond to a profile but they don't allow you to have multiple columns (or screens) displaying each account, different information from the same account or public information from the social network that are traversed by "swiping gestures" on a touch screen or by arrow keys (either mechanical or virtual).

U.S. Pat. No. 7,188,153, to Lunt, et al. issued Mar. 6, 2007 disclosed a system and method for managing connections in an online social network which indicates other individuals with whom they have a personal relationship with. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

An online social network collects descriptive data about various individuals and allows those individuals to indicate other individuals with whom they have a personal relationship. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

U.S. Pat. No. 6,618,593 issued Sep. 8, 2003, teaches a mobile device app having location sensing awareness technology.

SUMMARY OF INVENTION

The method of inducing content uploads in a social network disclosed a method of inducing content uploads in an online network includes the steps of storing content relating to a first member of the network that is submitted by a second member of the network, receiving approval of the content from the first member, and associating the content with the first member. The uploaded content may comprise an image file containing a photo of the first member and a caption associated with the photo image. The second user uploads the content relating to the first member using a GUI. This GUI is made available to the second user through a hyperlink that appears when a profile page of the first member is accessed if the degree of separation between the first member and the second member is less than or equal to a maximum degree of separation set by the first user. On the other hand, the hyperlink to this GUI will not appear when the profile page of the first member is accessed by the second member if the degree of separation between the first member and the second member is greater than the maximum degree of separation set by the first user. The default setting for this maximum degree of separation is one.

A method and apparatus for calculating, displaying and acting upon relationships in a social network is described. A computer system collects descriptive data about various individuals and allows those individuals to indicate other individuals with whom they have a personal relationship. The descriptive data and the relationship data are integrated and processed to reveal the series of social relationships connecting any two individuals within a social network. The pathways connecting any two individuals can be displayed. Further, the social network itself can be displayed to any number of degrees of separation. A user of the system can determine the optimal relationship path (i.e., contact pathway) to reach desired individuals. A communications tool allows individuals in the system to be introduced (or introduce themselves) and initiate direct communication.

The following definitions shall be used for terms found herein:

Descriptive Data. Information that describes a user or characteristics of a user. For example, descriptive data might include a first and last name. Or it might include elements that describe attributes of the user, such as gender, marital status or occupation.

Friend. In an exemplary implementation of the system, the list of users who have accepted invitations from a user to join the system or have otherwise been designated as having a direct (i.e., one degree) relationship with the user.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

Interface. Any mechanism by which an external individual or external computer can obtain and provide data, respectively to or from the database of the present invention. One common example of the interface is a web site. Other examples might include an e-mail message, a telephone voice message or a paper report.

Intermediate acquaintance(s). The individual or individuals connecting any two other individuals in a social network. For example, if A is connected to B through C and D (i.e., A< >C< >D< >B) then C and D are the intermediate acquaintances.

Mutual acquaintance. See "Intermediate Acquaintance"

Relationship Data. Information about the friends of a user of the system. Can include the list of friends, list of individuals invited to join the system, etc.

Social Network. An aggregation of individual social relationships, out to any number of degrees of separation.

User. An individual who has registered in the system.

Web Site. A computer system that serves informational content over a network using the standard protocols of the World Wide Web. As used herein, the term is generally intended to encompass both (i) the hardware/software server components that serve the informational content over the network, and (ii) the "back end" hardware/software components, including any non-standard or specialized components, that interact with the server components to perform services for Web site users.

The present invention includes software application running on multiple wireless devices (iPhone, Blackberry, etc.) to allow end users to receive ads or profiles in the form of images, text while simultaneously listening to audio transferred to their wireless device via a wireless connection to the internet or via the cellular provider's data network (including but not limited to 3G/4G networks) over the internet from a server or set of servers.

The present invention includes software application to allow end users of multiple wireless devices to send and receive voice messages to each other by selecting their ad or profile utilizing a wireless connection over the internet, or via the cellular provider's data network (including but not limited to 3G/4G networks to a server or to the sender/receivers wireless devices directly.

The present invention also includes social networking application running on iPhone™ or Blackberry™ to allow end users to receive ads or profiles in the form of images, text while simultaneously listening to audio transferred to their wireless device via a wireless connection to the internet or via the cellular provider's data network (including but not limited to 3G/4G networks) over the internet from a server or set of servers.

The present invention also includes social networking application to allow end users of an iPhone or Blackberry to send and receive voice messages to each other by selecting their ad or profile utilizing a wireless connection over the internet, or via the cellular provider's data network (including but not limited to 3G/4G networks to a server or to the sender/receivers wireless devices directly.

The present invention also includes eCommerce application running on iPhone™ or Blackberry™ to allow end users to receive ads or profiles in the form of images, text while simultaneously listening to audio transferred to their wireless device via a wireless connection to the internet or via the cellular provider's data network (including but not limited to 3G/4G networks) over the internet from a server or set of servers.

The present invention also includes eCommerce application to allow end users of an iPhone™ or Blackberry™ to send and receive voice messages to each other by selecting their ad or profile utilizing a wireless connection over the internet, or via the cellular provider's data network, including but not limited to 3G/4G networks to a server or to the senders/receivers wireless devices directly.

A software application for a handheld device to allow end users on mobile devices or desktop computers (i.e. iPhone, Blackberry, Treo (though outdated)) to view profiles of themselves that contain image(s) and/or video while simultaneously hearing and audio description of their ad via wireless connection to the internet and/or the cellular provider data network (streaming or intact multimedia file). A software application for a handheld device to allow end users on mobile devices to record, send, receive and playback voice messages to other users running the same application after selecting the initiating user selects the other user's profile utilizing the cell phone's microphone and speaker via Wi-Fi cellular data path (included but not limited to VoIP, WAV, VOX, WMV, MOV, 3GG file formats). A software application for a handheld device that allows users to have a live conversation which each other, utilizing VoIP with a wireless internet connection or the cellular data path with VoIP after the initiating user selects on the other user's profile. A software application for a handheld device that allows multiple end users on mobile devices to have a live conversation or pass voice messages to each other, utilizing method described above allowing multiple users to join what is referred to in the industry as a "chat room". Software application running on multiple wireless devices (iPhone, Blackberry, etc.) to allow end users to receive ads or profiles in the form of images, text while simultaneously listening to audio transferred to their wireless device via a wireless connection to the internet or via the cellular provider's data network (including but not limited to 3g networks) over the internet from a server or set of servers. Software application to allow end users of multiple wireless devices to send and receive voice messages to each other by selecting their ad or profile utilizing a wireless connection over the internet, or via the cellular provider's data network (including but not limited to 3g networks to a server or to the sender/receivers wireless devices directly. Application running on iPhone or Blackberry to allow end users to receive ads or profiles in the form of images, text while simultaneously listening to audio transferred to their wireless device via a wireless connection to the internet or via the cellular provider's data network (including but not limited to 3g networks) over the internet from a server or set of servers. Software application to allow end users of an iPhone or Blackberry to send and receive voice messages to each other by selecting their ad or profile utilizing a wireless connection over the internet, or via the cellular provider's data network (including but not limited to 3g networks to a server or to the sender/receivers wireless devices directly. eCommerce application running on iPhone or Blackberry to allow end users to receive ads or profiles in the form of images, text while simultaneously listening to audio transferred to their wireless device via a wireless connection to the internet or via the cellular provider's data network (including but not limited to 3g networks) over the internet from a server or set of servers. eCommerce application to allow end users of an iPhone or Blackberry to send and receive voice messages to each other by selecting their ad or profile utilizing a wireless connection over the internet, or via the cellular provider's data network (including but not limited to 3g networks to a server or to the sender/receivers wireless devices directly. Software application as described in terms 1 thru 8 that allows custom colors to be set for each user messages are received from. Software application as described in terms 1 thru 8 that allows screens displaying messages received from different accounts to be traversed by a "swiping gesture". Software application as described in terms 1 thru 8 that allows screens displaying messages received from different accounts to be traversed by arrow keys. Either by mechanical or virtual keyboard. Social networking application as described in terms 1 thru 13 that interconnects only mobile handheld devices. Any messaging application that allows colors custom colors for senders and recipient messages to be set. Social networking application that allows custom colors for messages from a specific user to be set. It also provide means to control for mixing red, green and blue primary colors. Additionally, it allows user to change the theme by shaking the device, to save messages to the devices own contacts management application, email messages originating from the social network. It also integrates with the device's web browser to display web pages, photos, play video and audio.

DETAILED DESCRIPTION OF THE EMBODIMENT

Figure 1:
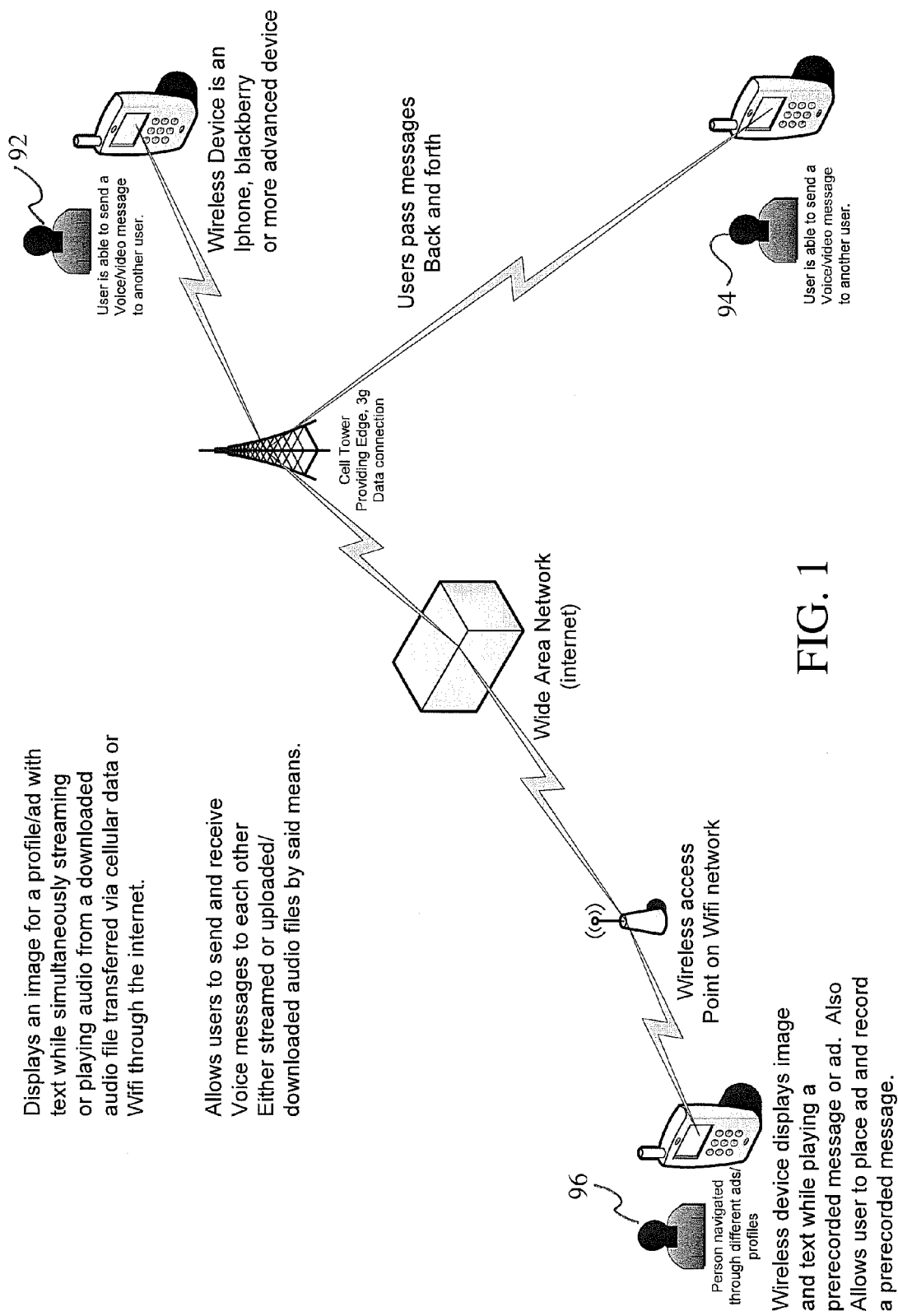
FIG. 1 is a representative diagram of the mobile device messaging application 100 of the present invention.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event that component parts of different embodiments have similar structure, functions or uses, they may have been given similar or identical reference numerals and descriptions. It will be understood that such duplication of reference numerals is intended solely for clarity, consistency and ease of understanding the present invention, and are not to be construed as limiting in any way or as implying, for example, that the various embodiments themselves are identical.

FIG. 1 is a representative diagram of the mobile device messaging application 100 of the present invention. The mobile device messaging application 100 of the present invention of runs on any smart phones such as Apple™'s iPhone™, Blackberry™ and iPod™ touch devices. In one embodiment, the program is written in the Objective C programming language. Porting the code to other mobile platforms such as Droid™ is viable, expected and planned.

An online social network collects descriptive data about various individuals and allows those individuals to indicate other individuals with whom they have a personal relationship. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

As best shown in FIG. 1, in one embodiment, with the launch of the present invention 100, users can display an image for profiles or ads, via WiFi or cellular data connection, e.g. 3G/4G through the internet, from social internet network such as Facebook with text while simultaneously streaming or playing audio from an uploaded/downloaded audio filer. The present invention 100 also allows users to record, upload, send and voice messages to other users on most online social network such as Twitter and receive and play audio filer/messages transferred via cellular data or WiFi through the internet.

As shown in FIG. 1, user 92 who has a hand-held 3G/4G or more advanced wireless device such as an iPhone™ can pass pre-recorded message back and forth with another user 94 who has a hand-held 3G/4G or more advanced wireless device such as an iPhone™. Presently the present invention 100 interfaces to the Twitter social network. Connecting to other social networks such as Facebook is planned for future releases along with the addition of video. Additionally a new social network may be started from users of the application.

Figure 2:
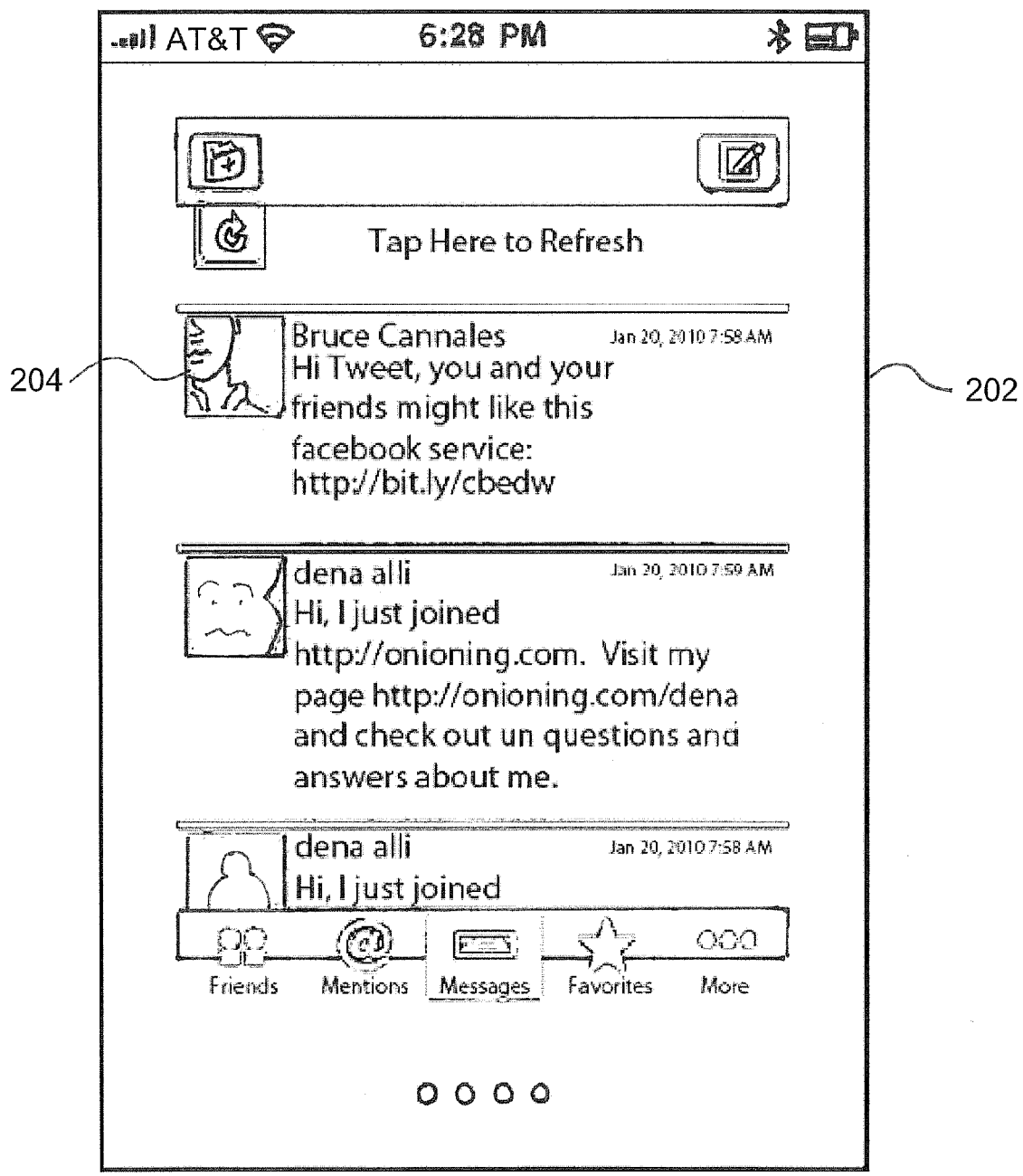
FIG. 2 is a graphic representation of home screen display 202 of the mobile device messaging application 100 of the present invention.

FIG. 2 is a graphic representation of home screen display 202 of the mobile device messaging application 100 of the present invention. When the mobile device messaging application is initiated, the Home screen 202, as shown in FIG. 2 will show. Users can make a swiping gesture on the screen to scroll between different account screens showing profiles and messages. For further examination/action user taps on Home screen 202 to enlarge it. To respond to a profile the user can either tap on the name or tap on the rest of the message area 204 to bring up an intermediate screen 802 as best shown in FIG. 8.

Figure 8:
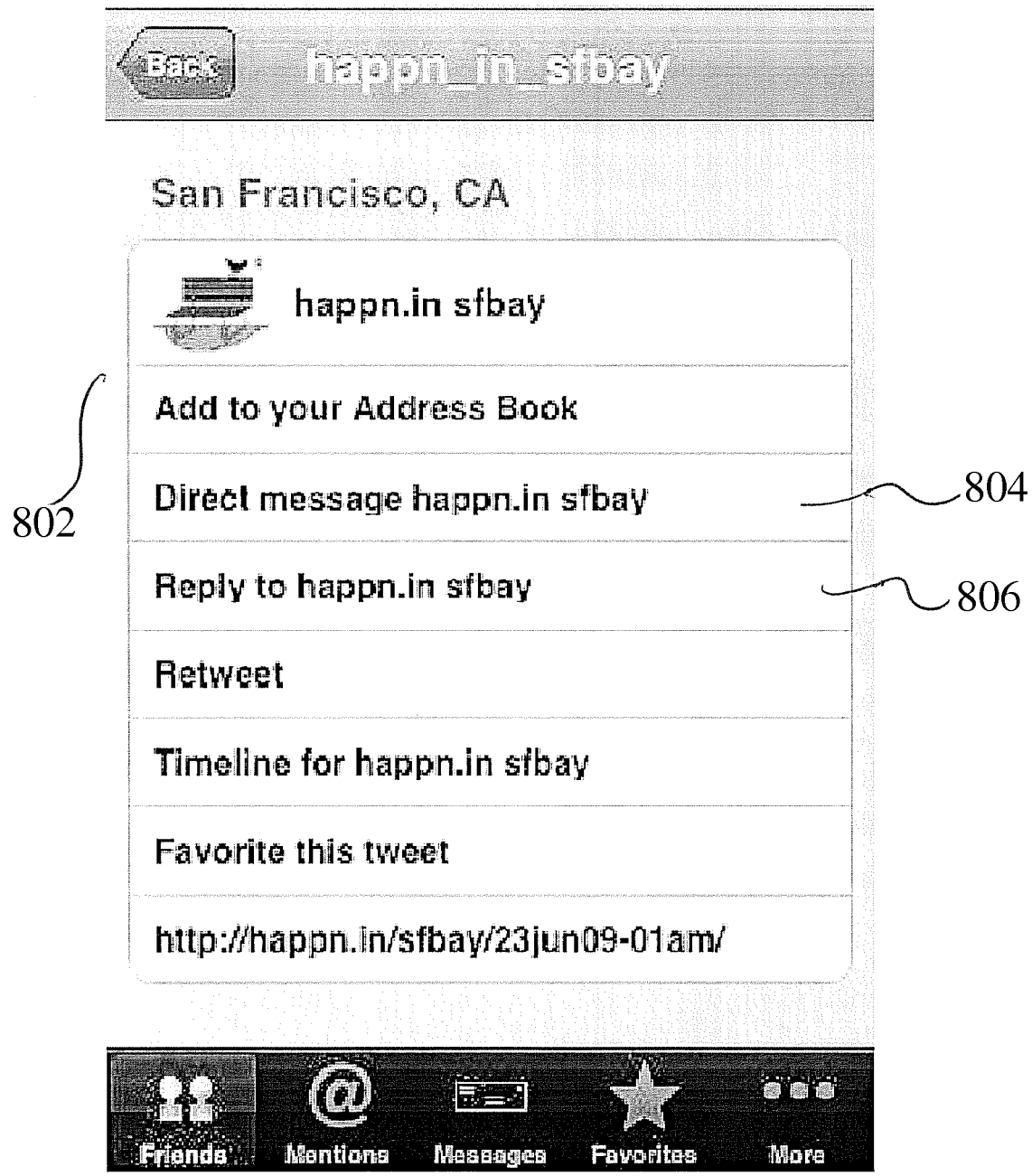
FIG. 8 is a graphic representation of intermediate screen display 802 to handle message of the mobile device messaging application 100 of the present invention.

FIG. 8 is a graphic representation of intermediate screen display 802 to handle message of the mobile device messaging application 100 of the present invention. Then users can tap on either direct message button 804 or reply to button 806 on the intermediate screen 802. With that action, compose screen 502 will appear as best shown in FIG. 5.

Figure 5:
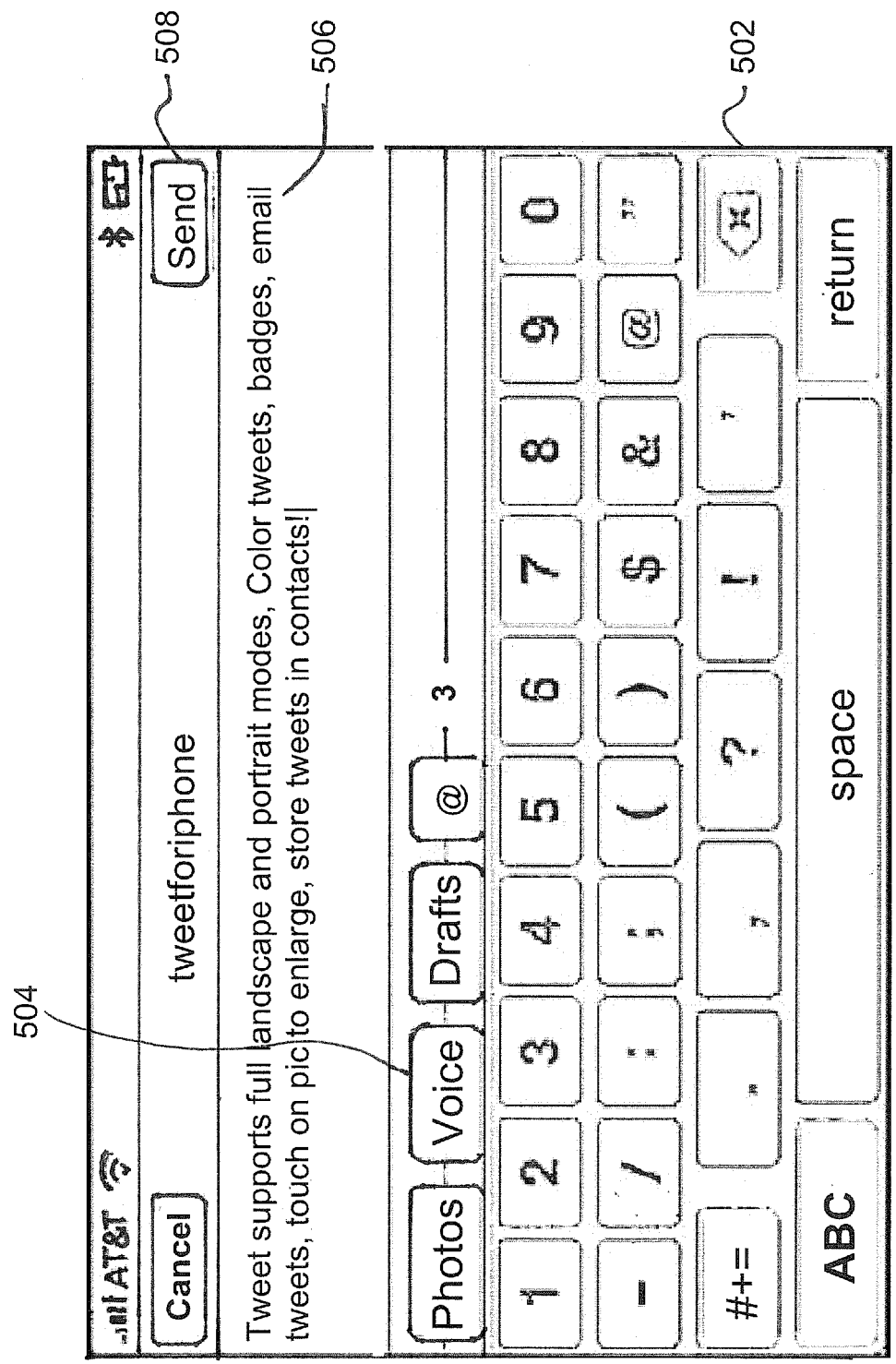
FIG. 5 is a graphic representation of screen display of keyboard view 502 with device in landscape mode showing voice button 504.

FIG. 5 is a graphic representation of screen display of keyboard view 502 with device in landscape mode showing voice button 504. Users can enter a text message 506 and record a voice message by tapping on voice button 504 The pressing of voice button 504 will bring up record screen 602 as best shown in FIG. 6.

Figure 6:
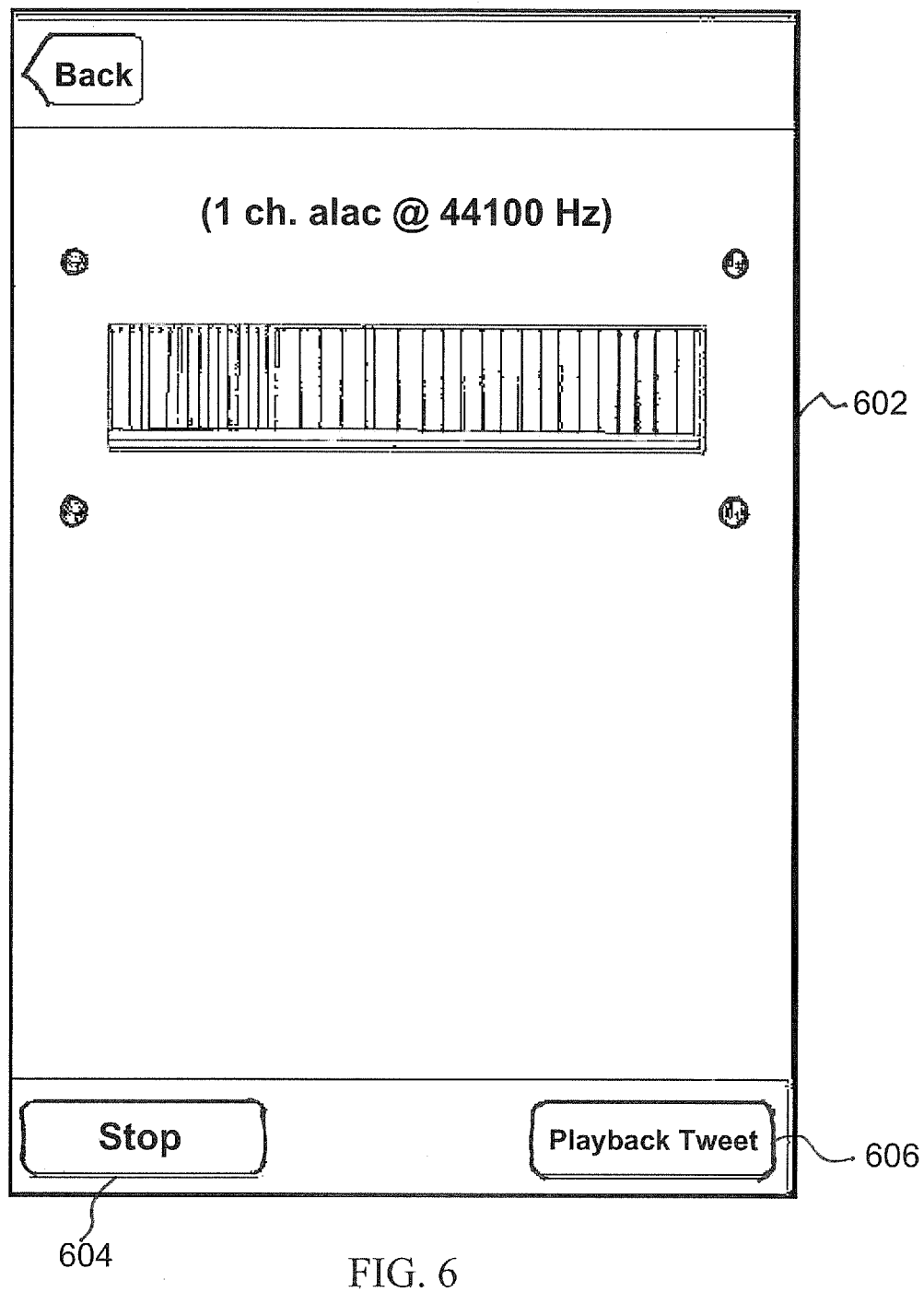
FIG. 6 is a graphic representation of record screen display 602 of the mobile device messaging application 100 of the present invention.
Figure 7:
FIG. 7 is a graphic representation of screen display of keyboard view with search result in portrait mode with a compatible device.

FIG. 6 is a graphic representation of record screen display 602 of the mobile device messaging application 100 of the present invention. Users tap record/stop button 604 on the bottom left of the record screen 602. Before recording, the display of record/stop button 604 is "record". Subsequent to that, user may record an audio recording such as a voice message, music, etc. While audio recording is taking place, the display of record/stop button 604 will change to "stop". When sound recording session is finished, user will press the record/stop button 604 again. In the case that users would like to review the recorded material, they can tap playback button 606 on the lower right. Users can repeat the above process until they are satisfied with their recording. After finishing recording, users will tap back button 608 and is taken back to compose screen 502 as best shown in FIG. 5. Users may proofread, modify their text message and then tap send button 508 to upload their text and voice message to any social network of their choice.

Figure 9:
FIG. 9 is a graphic representation of color settings screen display 902 of the mobile device messaging application 100 of the present invention.
Figure 9:

FIG. 9 is a graphic representation of color settings screen display 902 of the mobile device messaging application 100 of the present invention. Another unique feature of the application is the custom color settings so that all messages from a particular user appear in a certain pre-determined color. When users enter color settings page 902 as best shown in FIG. 9, a default color setting is available for messages from all users who do not have a custom color saved. As shown in FIG. 9, if users desire to change the default color setting, they can simply manipulate the primary color combination by tap sliding on primary color scales which includes red, green and blue. Additional control scales such as opacity, brightness etc. can be added to make the color setting more refined. The entire mechanism is similar to color mixing/setting controls that are used in graphics applications for desktop computers.

Figure 3:
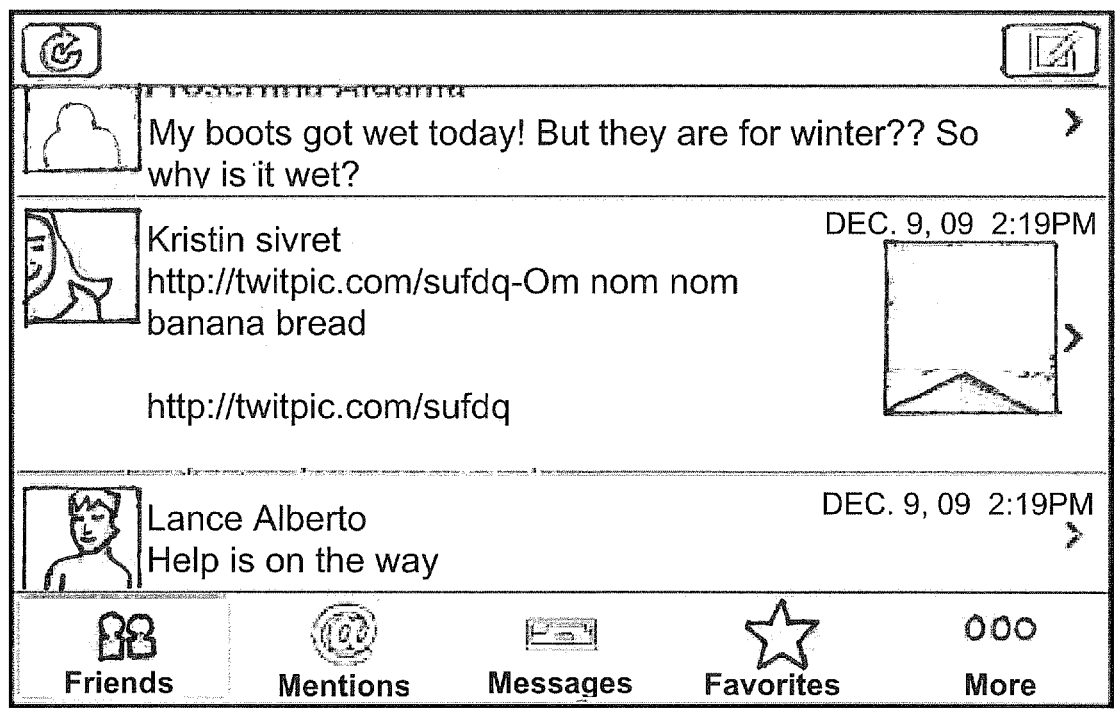
FIG. 3 is a graphic representation of screen display of Friend's timeline in landscape mode with a compatible device.
Figure 4:
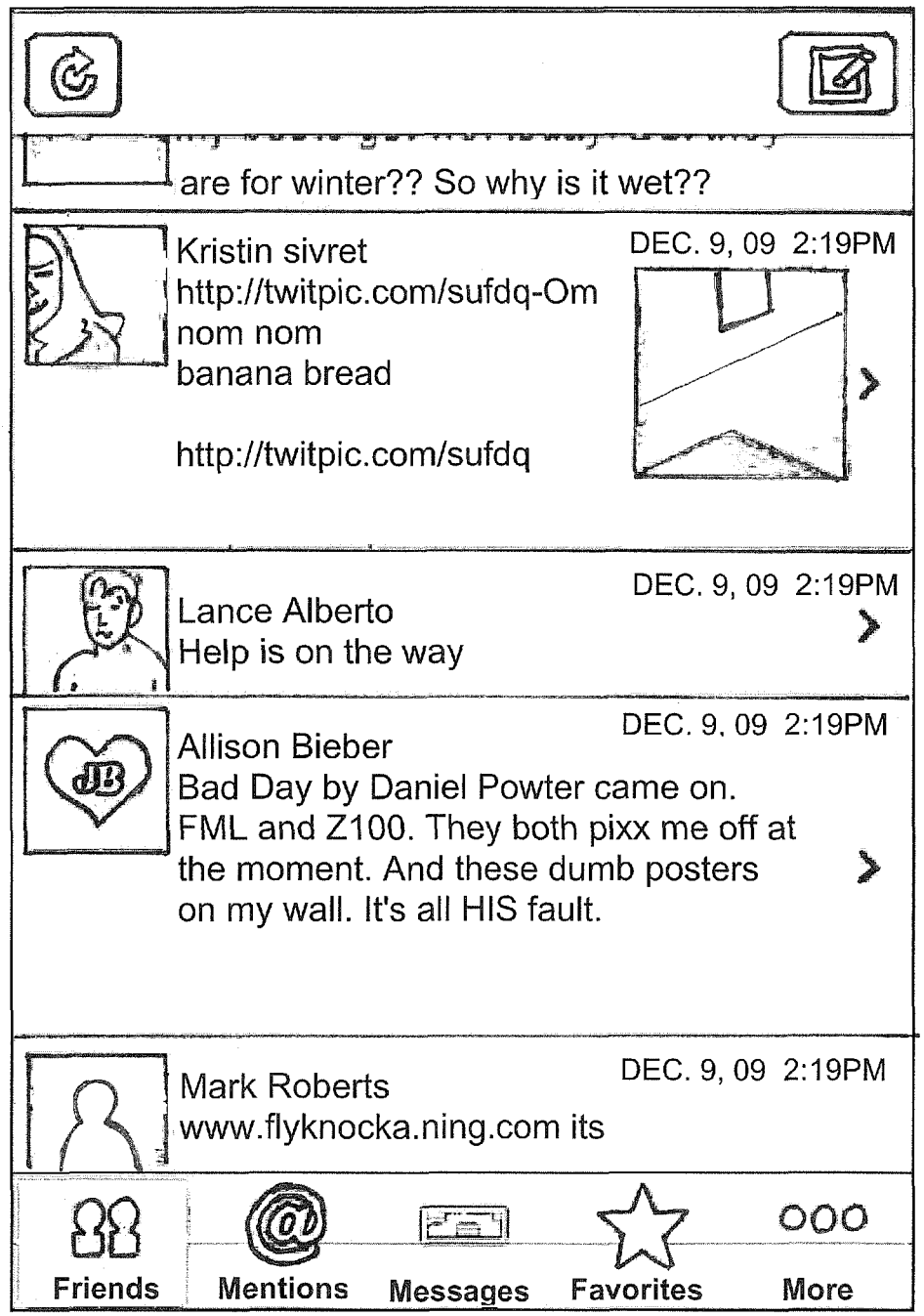
FIG. 4 is a graphic representation of screen display of Friend's timeline in portrait mode with a compatible device.

FIG. 3 is a graphic representation of screen display of Friend's timeline in landscape mode with a compatible device. FIG. 4 is a graphic representation of screen display of Friend's timeline in portrait mode with a compatible device. The application also supports both portrait and landscape modes as best shown in FIGS. 3 and 4. Similar to printing on a piece of paper from a word processor or spreadsheet in portrait or landscape, mobile applications may be programmed with the ability to display their content with the appropriate height and width depending upon how the user is holding the device. For example, on iPhone™ the keyboard letters become wider in landscape mode so it is easier to type with a "landscape" keyboard. As best shown in FIGS. 3 and 4, when users initiate Friend's timeline page 302 from any online social network such as Twitter, if they receive an update from their "Friend" who uploaded a voice recording, an hyper link 304 will appear. If users tap the hyper link 304, providing they have WiFi or cellular provided data connection such as 3G/4G, their mobile device will be able to play back the pre-recorded voice message from their "Friend".

Figure 10:
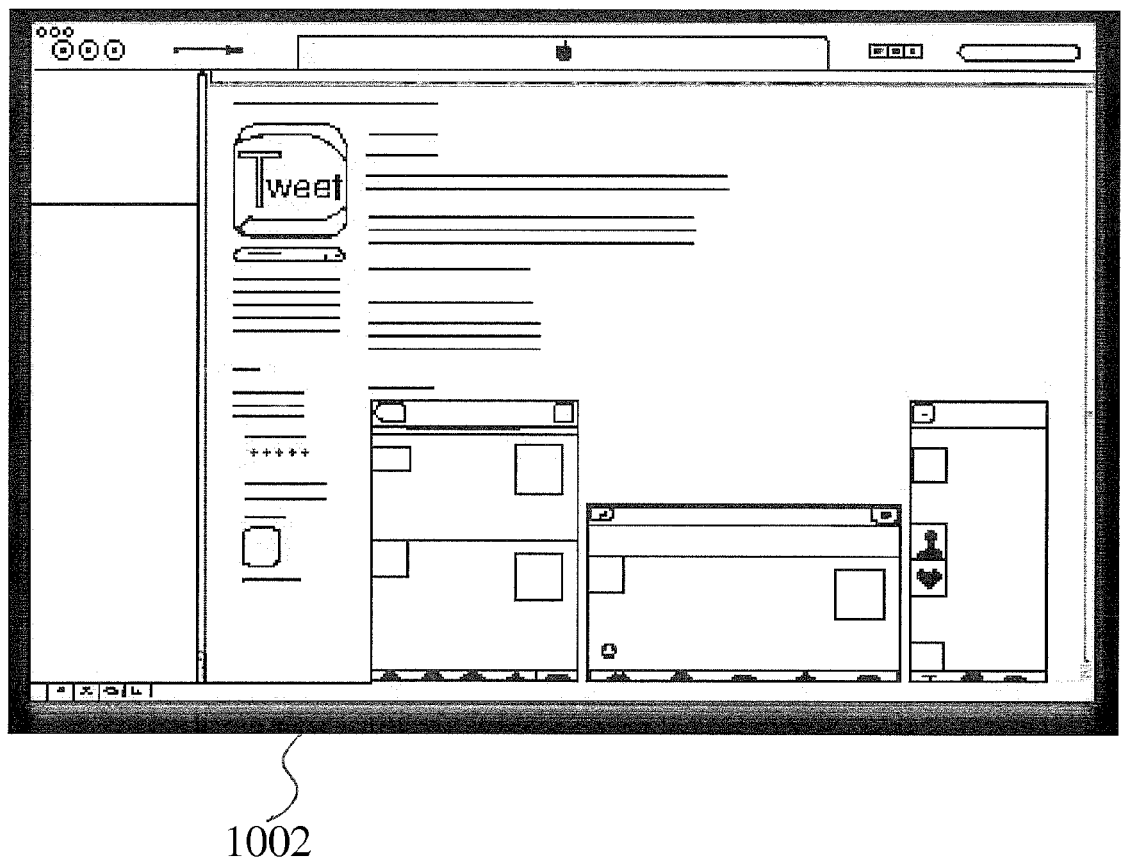
FIG. 10 is a graphic representation of application in Apple™ Application Store of the mobile device messaging application 100 of the present invention.

FIG. 10 is a graphic representation of application in Apple™ Application Store of the mobile device messaging application 100 of the present invention. The present invention 100 also supports both portrait and landscape modes. Similar to printing on a piece of paper from a word processor or spreadsheet in portrait or landscape, mobile applications may be programmed with the ability to display their content with the appropriate height and width depending upon how the user is holding the device. On the iPhone™ the keyboard letters become wider in landscape mode so it is easier to type with a "landscape" keyboard.

Web pages 1002 may be viewed using the device's built in browser as best shown in FIG. 10. If the URL links to video or audio in supported formats it will be played. The application integrates with the iPhone's own contacts list by allowing messages to be stored along with the username and photo. Messages from the social network may be emailed from the application. In one embodiment, shaking the phone will switch to different default display screen themes (photo size, text size, timestamp format, timestamp position). In one embodiment, users can also create their own display screen themes and set as an default or altering existing default display screen themes.

The application has the ability to store drafts of text messages when there is no internet connectivity available and/or at the user's discretion. Further enhancements for the application are the ability to store draft recordings before sending and the ability to automatically play back audio after each timeline of new messages downloads.

Figure 11:
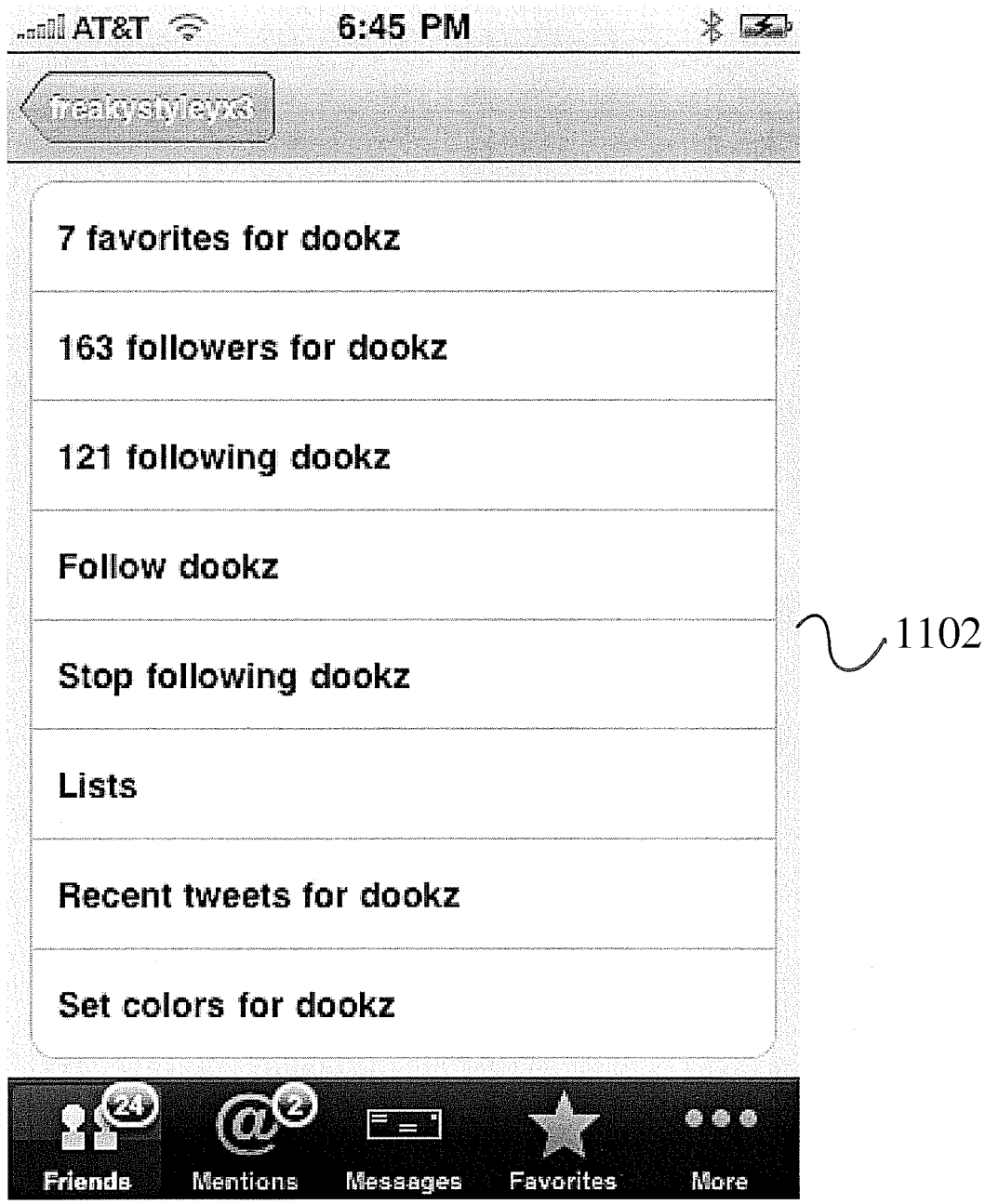
FIG. 11 is a graphic representation of user more information screen display 1102 of the mobile device messaging application 100 of the present invention.
Figure 12:
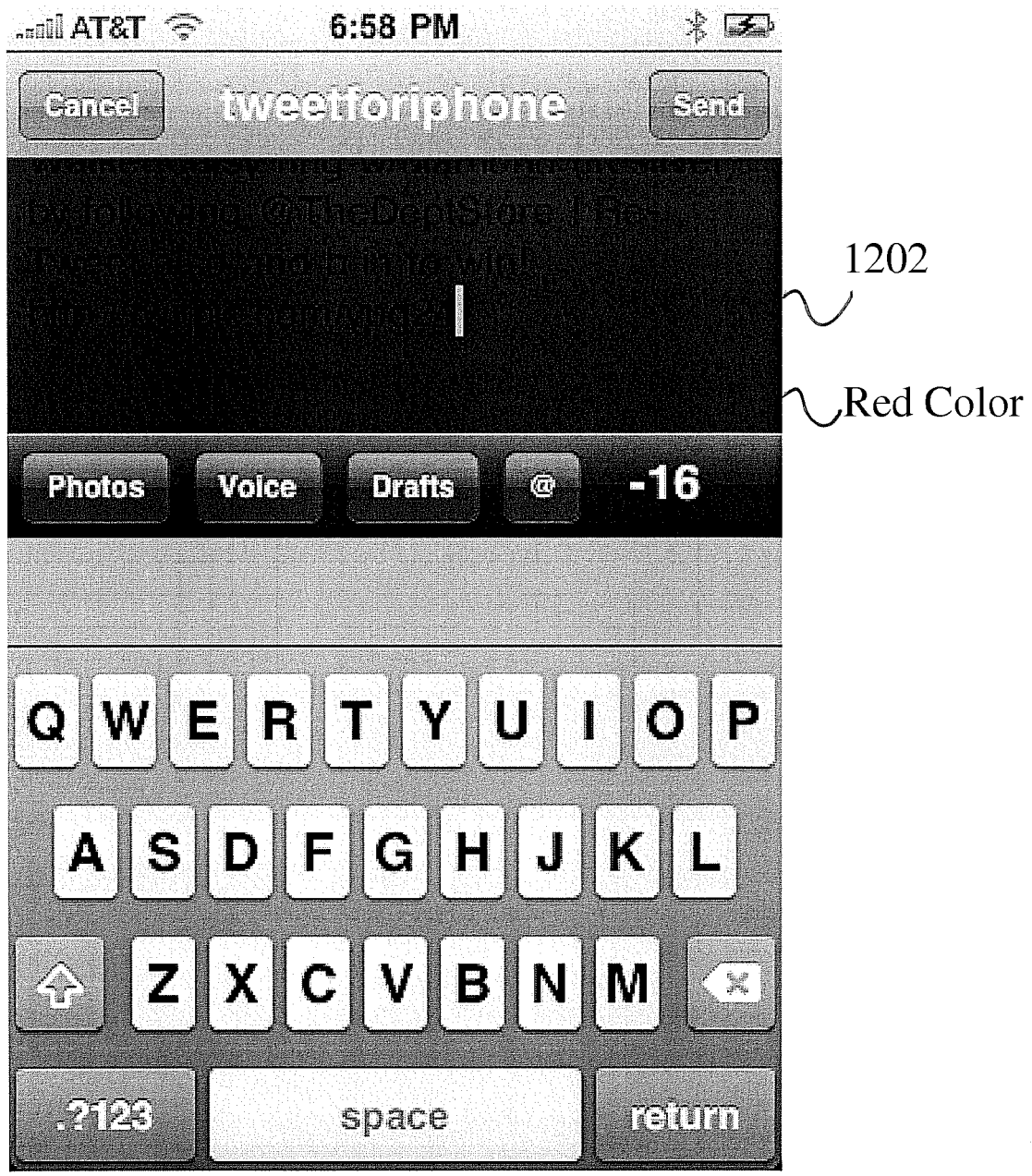
FIG. 12 is a graphic representation of the compose screen turning red 1202 of the mobile device messaging application 100 of the present invention when the user exceeds the number of characters allowed for their message display.
Figure 13:
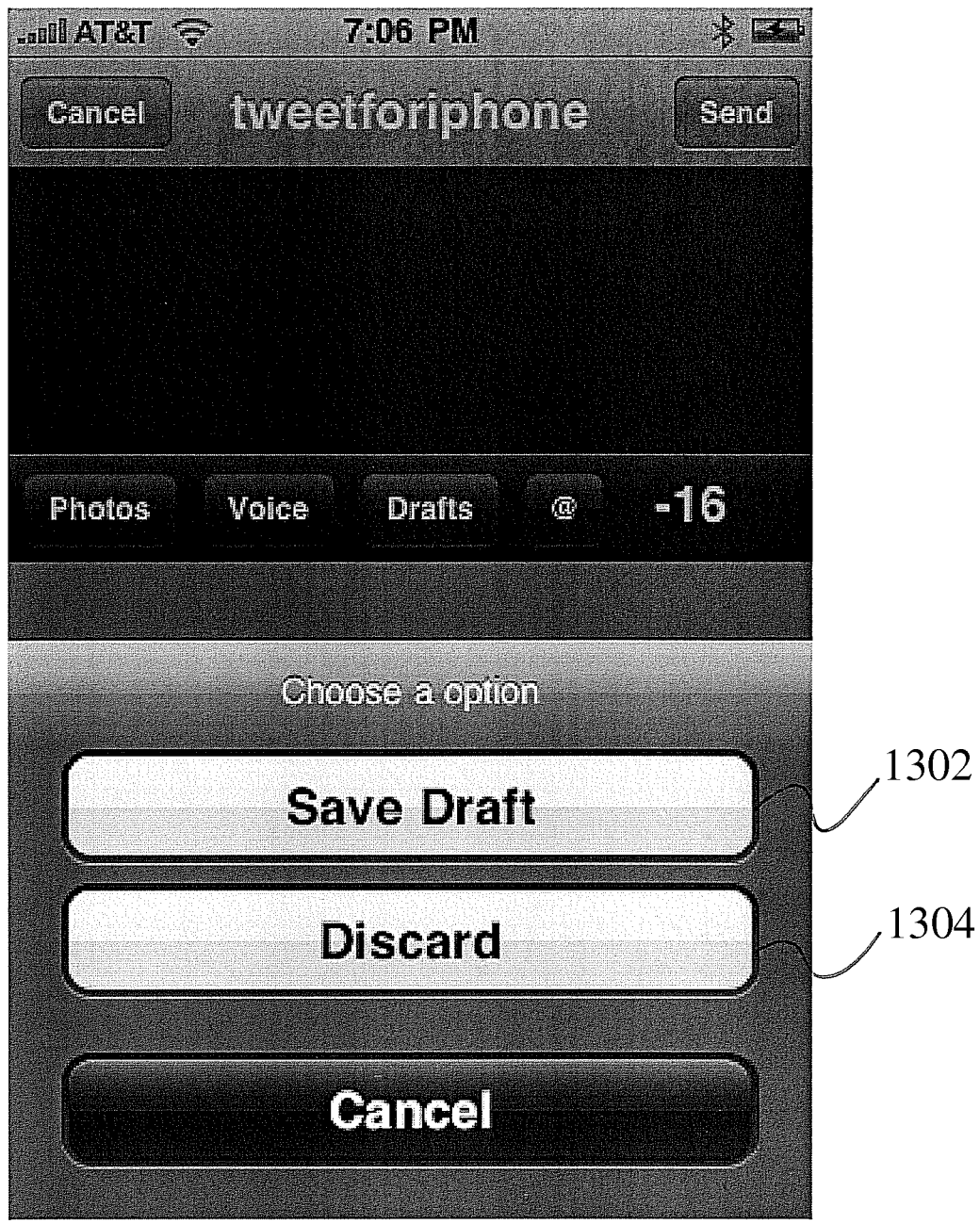
FIG. 13 is a graphic representation of the compose screen giving the user the option to save the composed text in the form of draft button 1302 or discard button 1304 in the mobile device messaging application 100 of the present invention.
Figure 14:
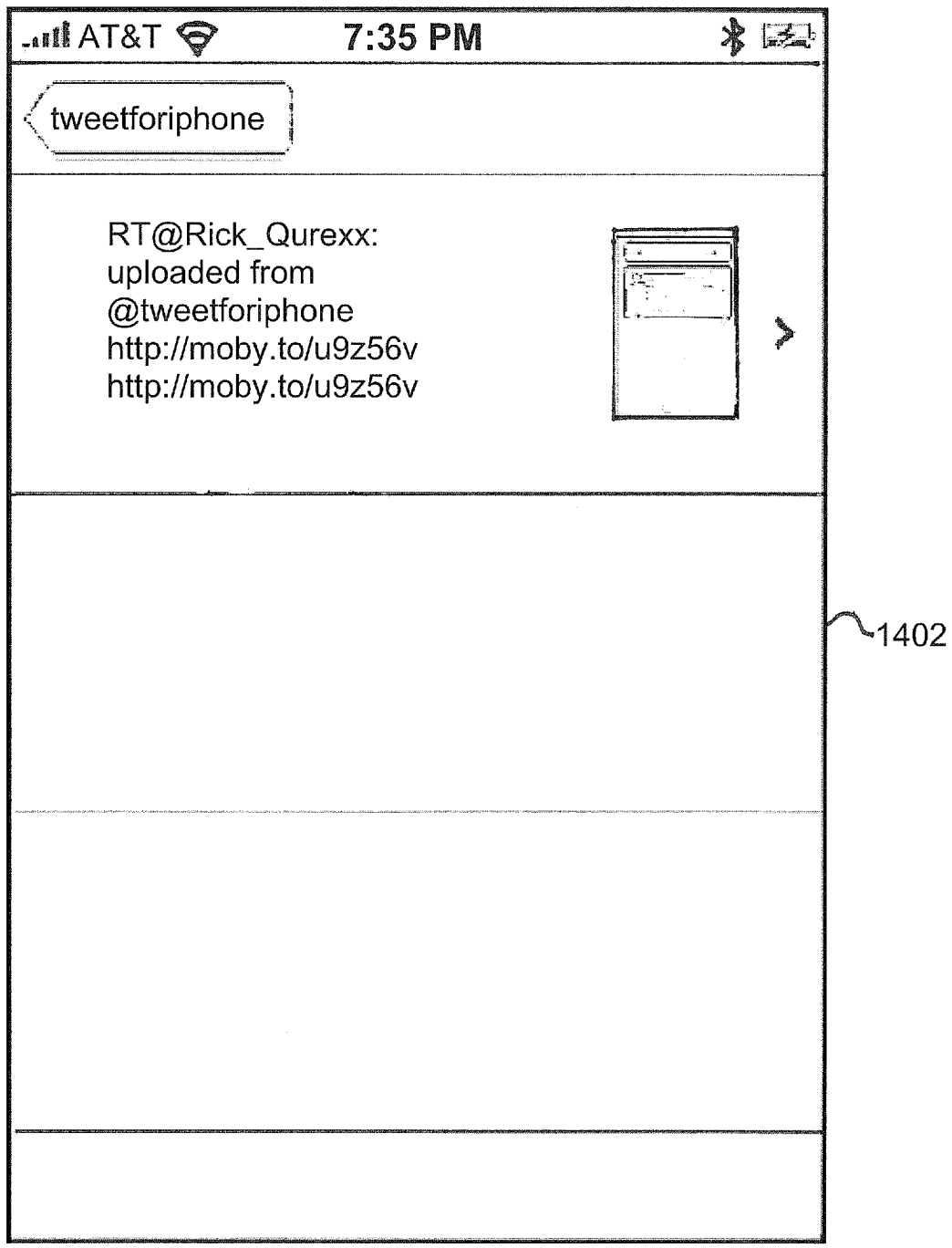
FIG. 14 is a graphic representation of the stored drafts screen 1402 of the mobile device messaging application 100 of the present invention.
Figure 15:
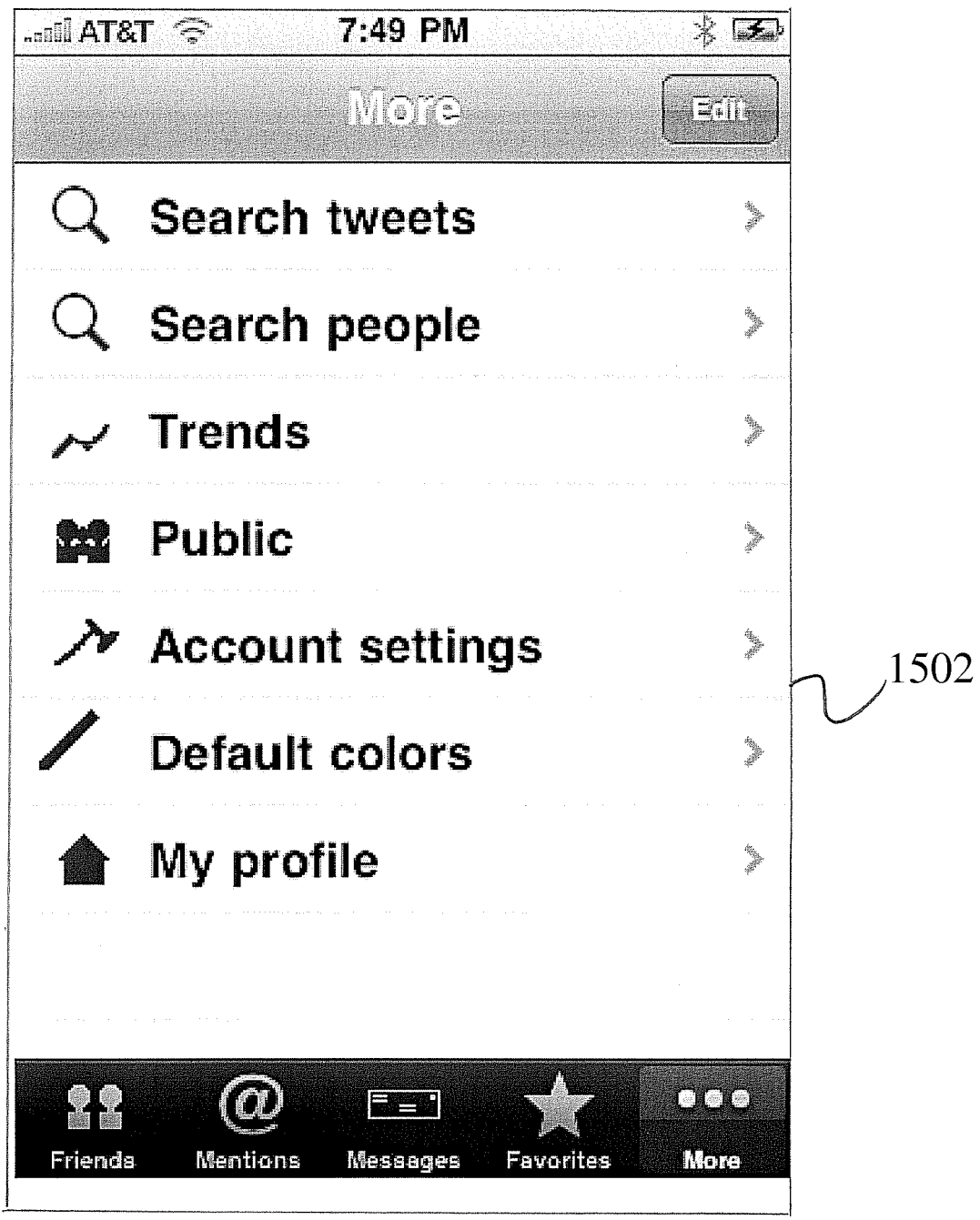
FIG. 15 is a graphic representation of the more tab options screen 1502 of the mobile device messaging application 100 of the present invention.
Figure 16:
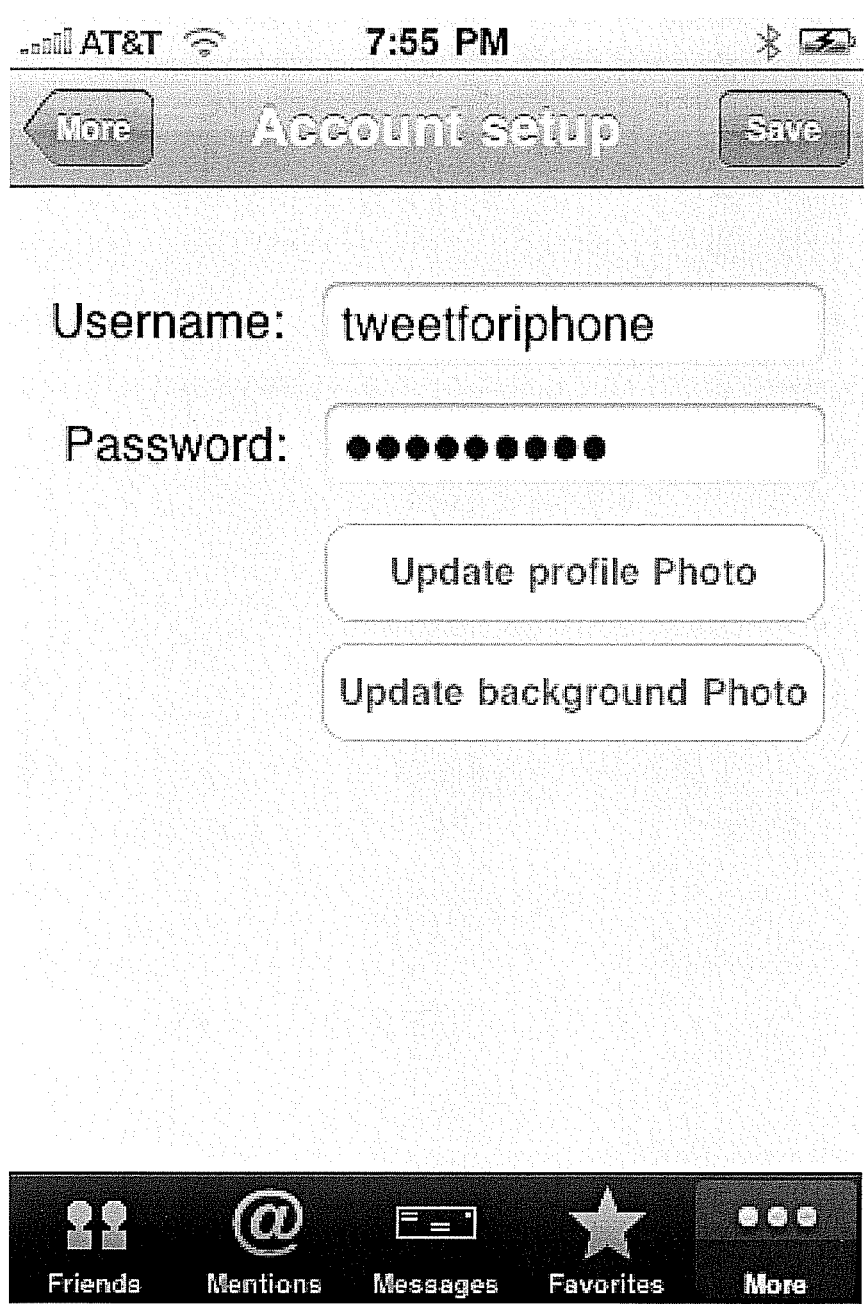
FIG. 16 is a graphic representation of the account setup screen 1602 of the mobile device messaging application 100 of the present invention.
Figure 17:
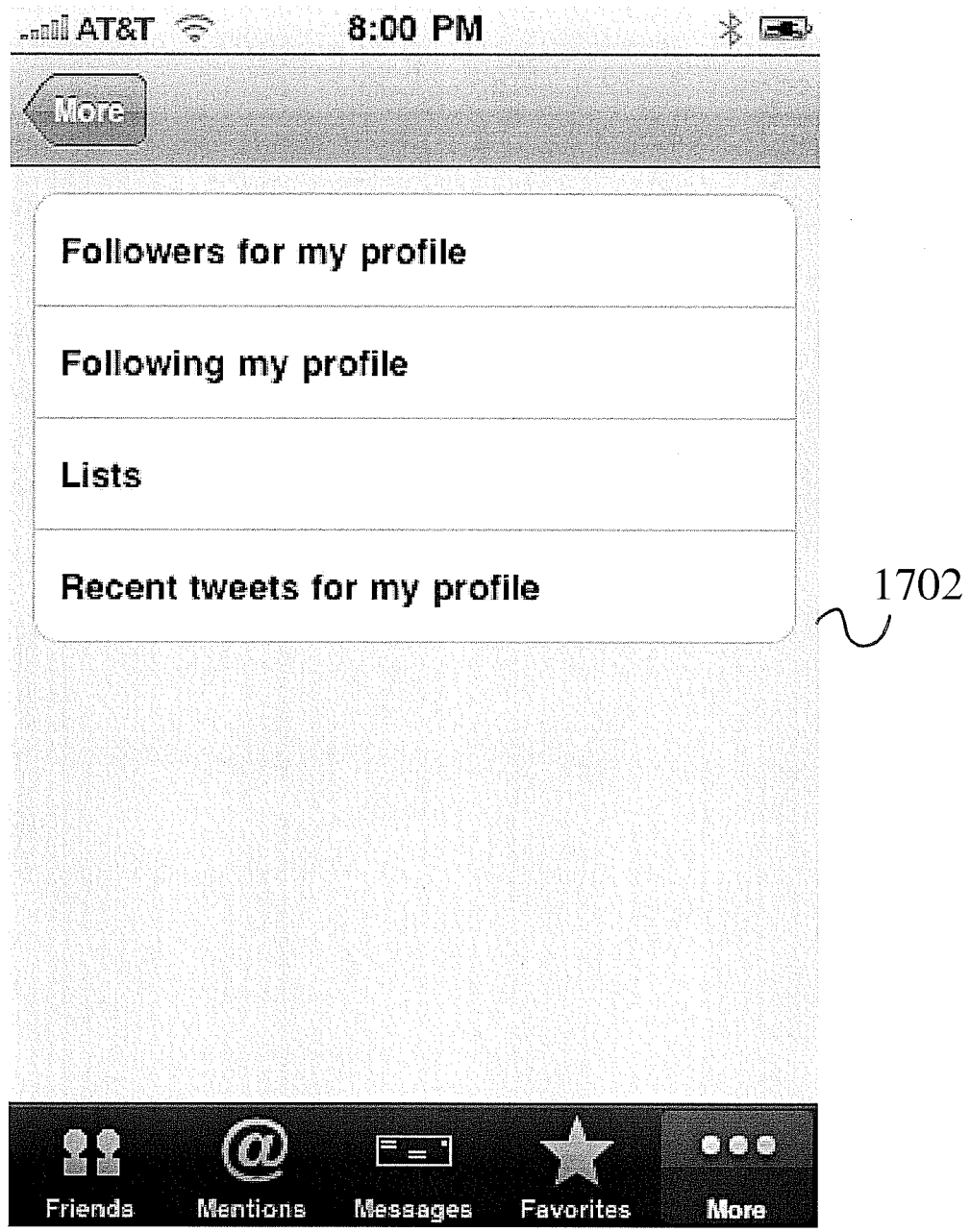
FIG. 17 is a graphic representation of the My Profile screen 1702 of the mobile device messaging application 100 of the present invention.
Figure 18:
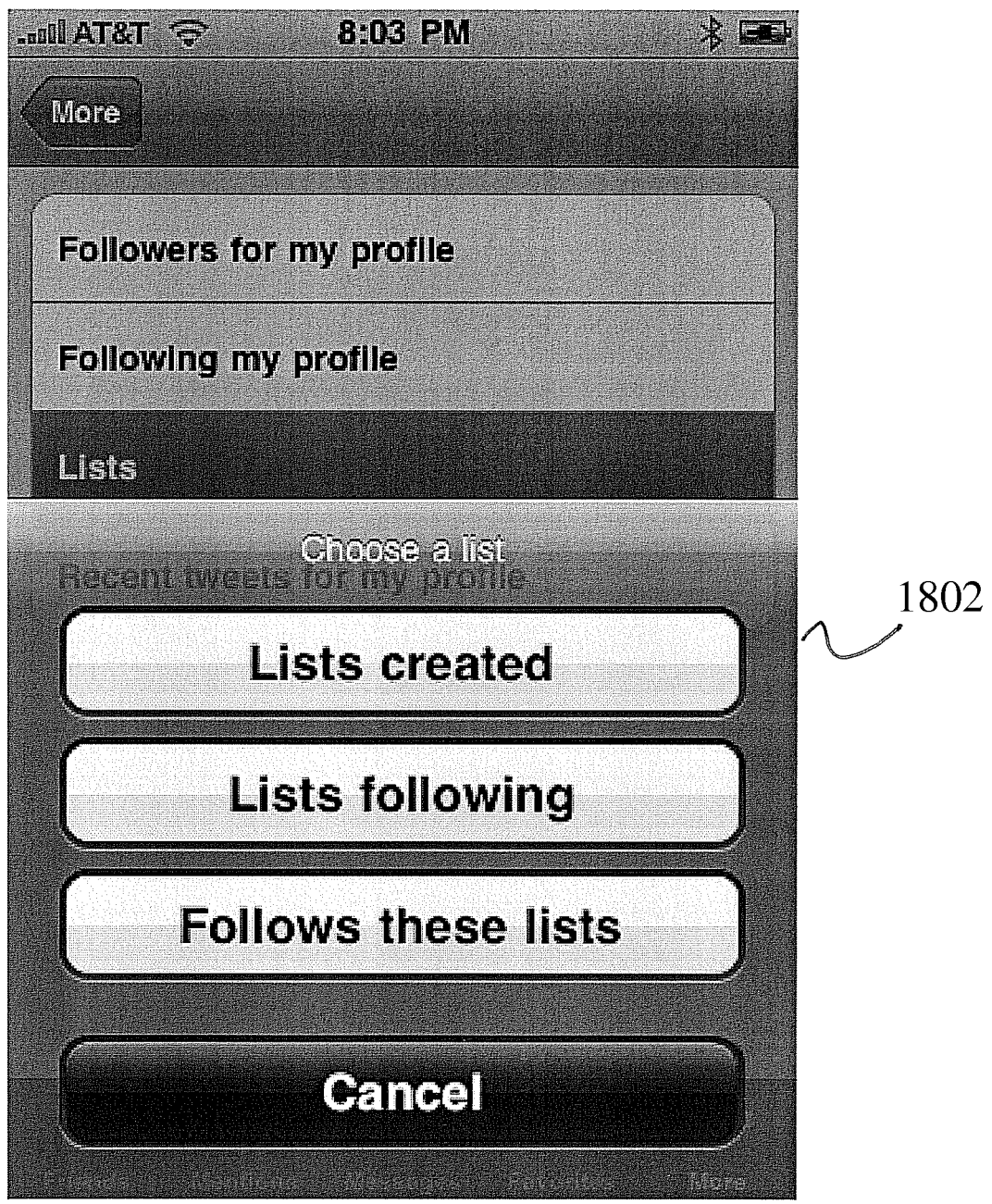
FIG. 18 is a graphic representation of the Choose a List screen 1802 of the mobile device messaging application 100 of the present invention.
Figure 19:
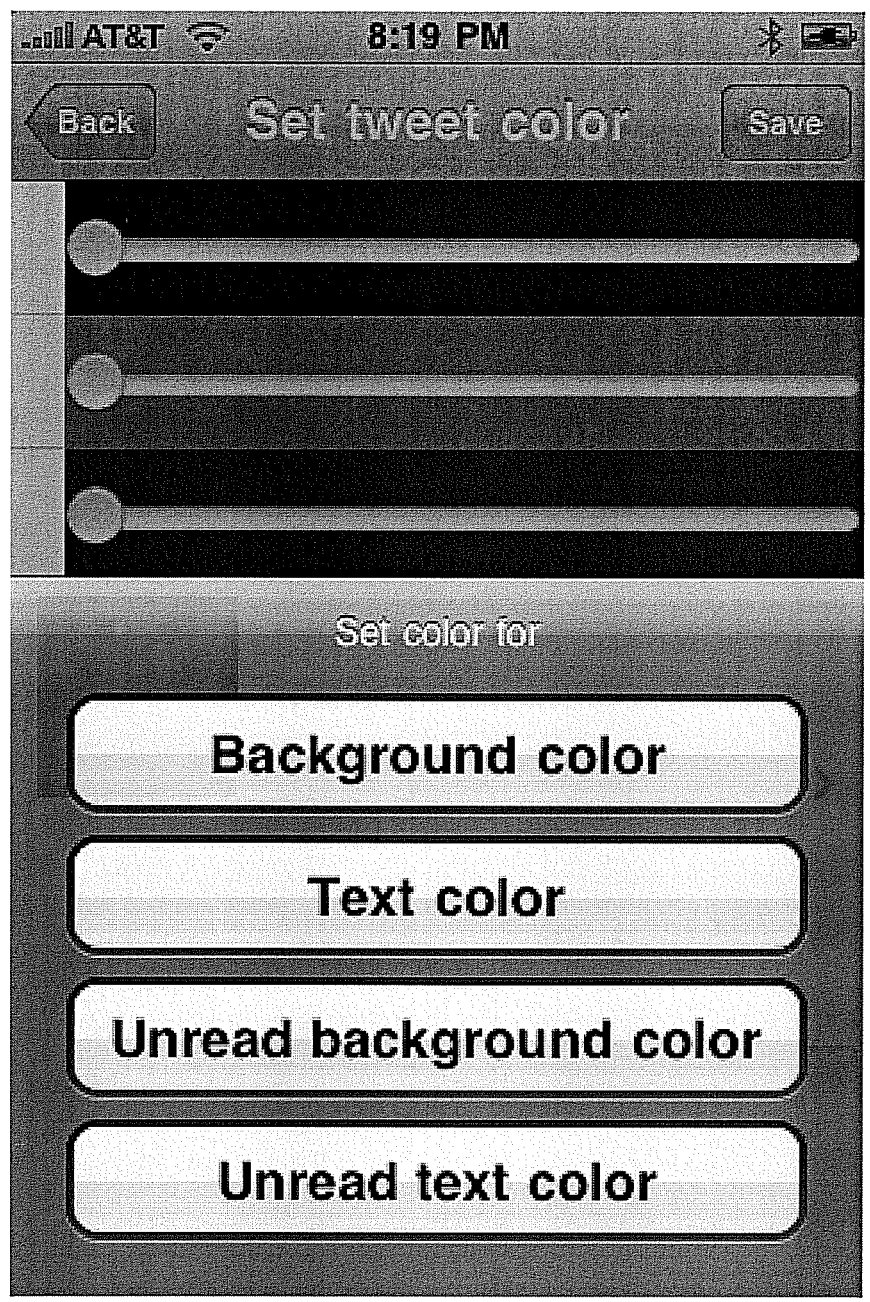
FIG. 19 is a graphic representation of the set tweet Color options screen 1902 of the mobile device messaging application 100 of the present invention.
Figure 20:
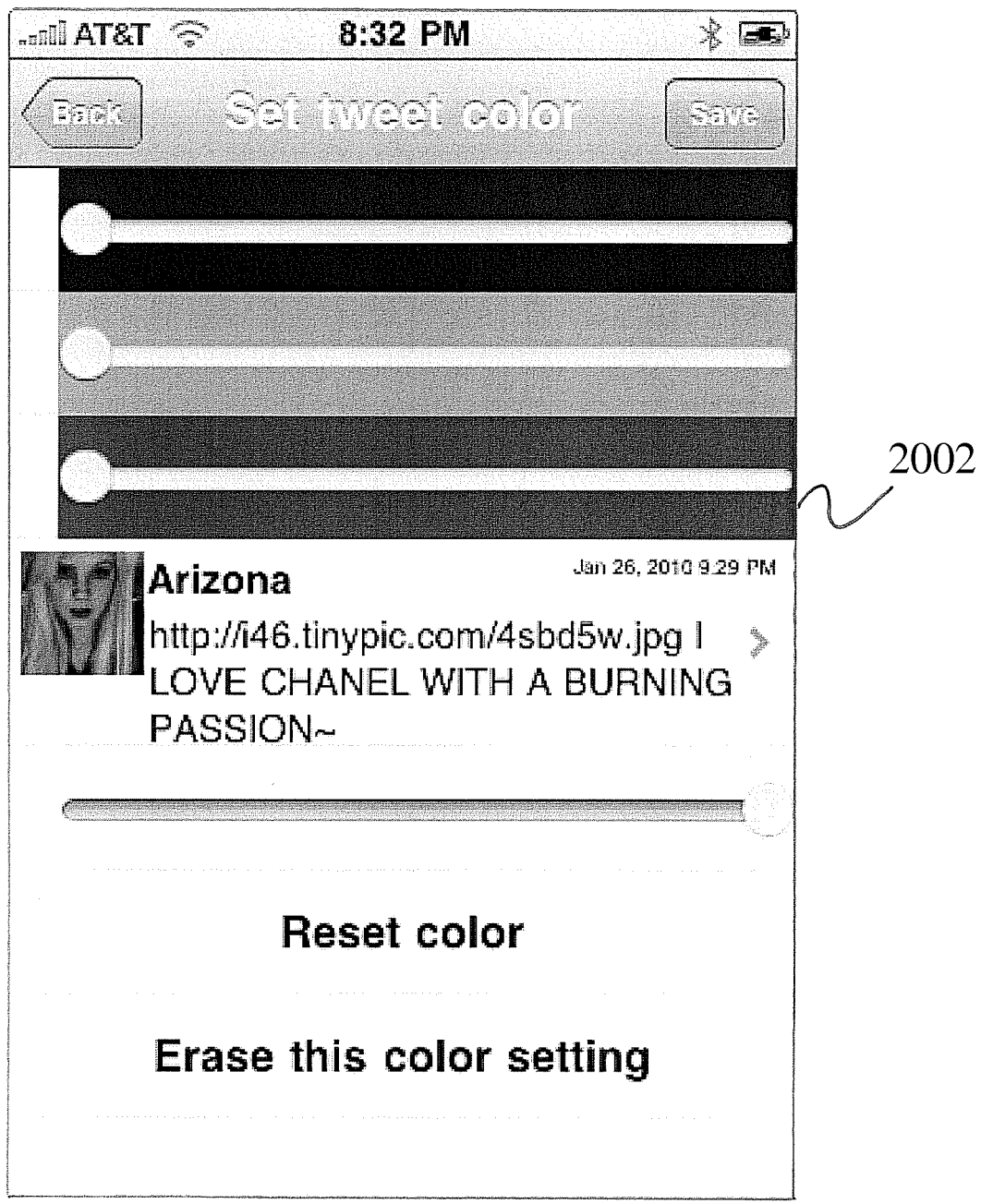
FIG. 20 is a graphic representation of the set tweet Color screen 2002 of the mobile device messaging application 100 of the present invention.
Figure 21:
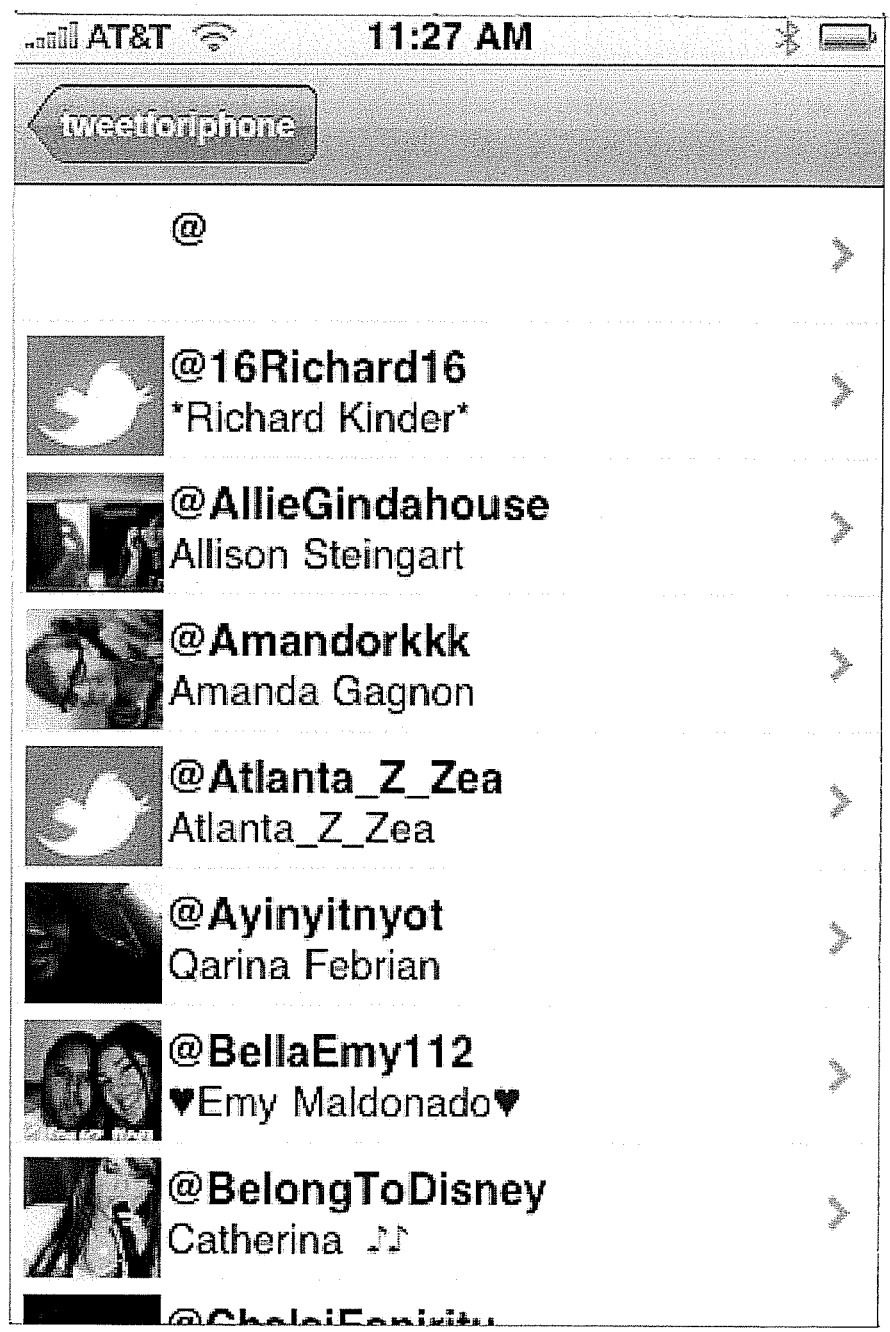
FIG. 21 is a graphic representation of the People picker screen 2102 of the mobile device messaging application 100 of the present invention. What is unique about this apps people picker is that it generates the people list from the currently selected (displayed) time line.

FIGS. 11-21 depict various screen displays of the present invention 100 providing different functions to users. FIGS. 11-21 are all self-explanatory as: FIG. 11 is a graphic representation of information screen display 1102 of the mobile device messaging application 100 of the present invention. FIG. 12 is a graphic representation of the compose screen turning red 1202 of the mobile device messaging application 100 of the present invention when the user exceeds the number of characters allowed for their message display. FIG. 13 is a graphic representation of the compose screen giving the user the option to save the composed text in the form of draft button 1302 or discard button 1304 in the mobile device messaging application 100 of the present invention. FIG. 14 is a graphic representation of the stored drafts screen 1402 of the mobile device messaging application 100 of the present invention. FIG. 15 is a graphic representation of the more tab options screen 1502 of the mobile device messaging application 100 of the present invention. FIG. 16 is a graphic representation of the account setup screen 1602 of the mobile device messaging application 100 of the present invention. FIG. 17 is a graphic representation of the My Profile screen 1702 of the mobile device messaging application 100 of the present invention. FIG. 18 is a graphic representation of the Choose a List screen 1802 of the mobile device messaging application 100 of the present invention. FIG. 19 is a graphic representation of the set tweet Color options screen 1902 of the mobile device messaging application 100 of the present invention. FIG. 20 is a graphic representation of the set tweet Color screen 2002 of the mobile device messaging application 100 of the present invention. FIG. 21 is a graphic representation of the People picker screen 2102 of the mobile device messaging application 100 of the present invention. It is unique about the people picker display 2102 of the present invention 100 is that it generates the people list from the currently selected (displayed) timeline.

In a preferred embodiment, the basic steps of the method of use and operation of the mobile app consist of the following:

Search results are displayed and an audio description starts playing for first person in the results; and As user scrolls to the next/previous ad, an audio description plays for that particular person.

In the method described above, the following steps can be taken:

User enters search criteria for people on a social network. Location, age, gender, interests, name for example;

User has the option to send a voice message to the person currently selected; and/or After the audio description finishes playing the index automatically moves to the next ad and starts playing the audio description.

Most hand-held 3G/4G or more advanced wireless devices nowadays have the ability to obtain their physical locations in real time through the Global Positioning System, cellular tower triangulation, IP addresses, tv signals, FM radio signals and more advanced systems such as electronic compass. There are different ways to incorporate the real time physical locations to the existing functions of the present invention 100. In one embodiment, the present invention 100 allows users 92 to attach their physical locations to their profiles, ads, text, voice and video messages at the time when said text, voice and video messages are being sent. On top of that, users 92 can set, assign and save custom colors for profiles, ads, text, voice and video messages sent and received based on their physical locations. Users 92 can further highlight profiles, ads, text, voice and video messages sent and received based on their physical locations by setting highlighted background colors, changing font sizes and font styles of said profiles, ads, text, voice and video messages sent and received. With the profiles, ads, text, voice and video messages sent and received colored and/or highlighted, users 92 can then sort profiles, ads, text, voice and video messages sent and received based on their physical locations and decide to send and receive profiles, ads, text, voice and video messages and have live conversations with other end users based on their physical locations and/or their assigned customer colors.

Attaching real time physical locations to profiles, ads, text, voice and video messages sent and received will also allow users 92 to be aware of other users 94 when they are in close physical proximity. Users 92 can turn on/off an automatic alert signal (sound, push and/or vibration) function such that when they are in close physical proximity, an alert signal will be sent to them. The threshold proximity level can be set by users 92 based on their preference (e.g. 1 miles, 20 miles, a specific cities, counties, etc.). Since user profiles are color-coded based on their real time physical locations, users 92 can simply sort them by color and decide which color coded profiles, ads, messages they would like to send or receive. Or users 92 can initiate a live chat will other uses 94 based on their physical locations/color-coded profiles, ads, and messages sent and received.

The following is a list of characteristics and/or specifications of the location based aware mobile messaging network obtained by Global Position System (GPS) satellite technology of the present invention:

1. Location based aware mobile messaging network obtained by Global Position System (GPS) satellite technology and cellular tower triangulation;

2. Location based aware mobile messaging network obtained by Global Position System (GPS) satellite technology, cellular tower triangulation and IP address;

3. Ability to attach above obtained location to user profiles created on mobile devices;

4. Ability to attach above obtained location to messages sent and delivered via mobile devices;

5. Ability to color code user profiles, images and messages by location obtained by 1 thru 3;

6. Ability to sort user profiles, images and messages by located obtained by 1 thru 3;

7. Ability to target delivery of messages, images, video or ads by location obtained by 1 thru 3; and 8. Ability to control audio or video streaming (languages based etc.) by location obtained by 1 thru 3.

Further characteristics of the proximity technology incorporated into the present invention include:

Ability to alert users when they come close to each other by sending an alert (voice message, video message, text message);

Ability to alert users when they come close to each other by color coding profiles; and/or Ability to alert users when they come close to each other by color coding messages.

Ability to allow integration with web browser in the mobile devices, wherefrom displaying web pages, photos and playing video and audio recording and ability to display in both portrait and landscape modes.

It will be understood by those skilled in the art that there are other ways of obtaining location. Location can be obtained on a mobile computing device via traditional television signals, presumably converted into a digital code from a detected analog signal, or FM radio signals. Further, given the spherical geometry of the Earth and complex mathematical formulae that describe its exact shape, location can also be determined via electronic compass and related computation-based technology.

In addition, it will be understood that highlighting in addition to color coding can be used to enhance the interface and display of the app on the screen of a mobile computing device. In addition to contrasting color highlighting, highlighting can be accomplished by changing the font or other characteristics such as bold, italic, etc.

The present invention also incorporates augmented reality technology: When looking at the screen of a phone, tablet with a camera or Google Glass, the live image will have objects highlighted. So if, for example, there is someone nearby on the social network who sends a message, the location where they sent the message from may be highlighted on the receiving person's device when the augmented reality device is pointed towards it. This is useful for finding someone in a crowd, for example.

Wearable computing devices include glasses and also contact lenses. There is technology that can be used in the present invention in which a contact lens has the same functionality as Google Glass.

Thus, the present invention can incorporate a pointer like a compass to help you find someone who has allowed their location to be transmitted to a user. Additionally, the use of GPS navigation, i.e. the Apple maps app or Google Maps app, to guide a user to someone else's location navigation via augmented reality, and to guide the user to someone else on the network, i.e., a blue line on the road if the user is driving to meet them, etc.

In addition to wearable computing, implants and brainwave sensing technology for use in fighter jets or other defense aircraft is still in experimental stages but is applicable and incorporated herein. As an example, the following article discusses technology related to brainwave-sensing for control and operation of inanimate objects, including televisions, computers, cooking devices, automobiles, etc: http://www usatoday com/ story/tech/2013/09/21/interaxon-muse-brain-sensing-headband/2837829/

Yet one additional aspect of the present invention is the ability to display the timeline for prior communications, messages, Tweets, etc., between users or for other purposes in portrait mode, or in landscape mode when the mobile computing device is rotated. Thus, the timeline can be displayed in either portrait or landscape, as desired.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A method for communicating data including text, pictures, sound recordings and video recordings via social networking websites using wireless connections to the internet and cellular provider data network, the method comprising the following steps:

obtaining a mobile device having wireless connectivity to the internet through a one or more of cellular provider data network, the mobile device further able to obtain its real time physical locations through the Global Positioning System, cellular tower triangulation, IP addresses, tv signals, FM radio signals; and operating a social networking mobile software application thereon, the application having the following features:

A. functions which allow end users to upload profiles and attach their physical locations obtained through the Global Positioning System, cellular tower triangulation and IP addresses on their profiles and view profiles of themselves on the particular mobile devices that contain visual contents while simultaneously hearing an audio description of their profile using streaming and intact multimedia file;

B. functions which allow end users to compose, send, receive and view text messages to and from an online social network from the mobile devices;

C. functions which allow end users to record, send, receive and playback voice and video messages on the mobile devices to other users running the same social networking software application after the initiating user selects the other user's profile utilizing the mobile devices' microphone and speaker via a WiFi/cellular data path;

D. functions which allow end users on the mobile devices to have a live conversation with each other, utilizing VoIP with a wireless internet connection or the cellular data path with VoIP after the initiating user selects on the other user's profile;

E. functions which allow multiple end users to have a live conversation or pass voice messages on the mobile devices to other users using compatible mobile devices and social networking mobile software application, thereby multiple users forming a chat room by joining to the same social network;

F. functions which allow end users to receive ads or profiles in the form of images and text while simultaneously listening to audio transferred to their wireless mobile device via a wireless connection to the internet or via the cellular provider's data network over the internet from a server or set of servers;

G. functions which allow end users of multiple wireless devices to send and receive voice messages to each other by selecting their ad or profile utilizing a wireless connection over the internet, or via the cellular provider's data network;

H. functions which allow end users to attach their physical locations to their text, voice and video messages at the time when said text, voice and video messages are sent;

I. functions which allow end users to set custom colors for profiles, ads, text, voice and video messages sent and received, said functions including tap slider selection scales for mixing desired amounts of red, green and blue primary colors and means for saving the custom colors;

J. functions which allow end users to sort profiles, ads, text, voice and video messages sent and received based on their physical locations;

K. functions to allow end users to sort profiles, ads, text, voice and video messages sent and received based on each of their assigned customer colors; and
L. functions which allow end users to send and receive profiles, ads, text, voice and video messages and have live conversations with other end users based on their physical locations.

2. The method of claim 1 in which the social networking mobile software application further having the features:
M. functions which send automatic alerts in the form of text, audio and video messages to end users in close physical proximity based on the physical locations attached to their profiles.

3. The method of claim 1 in which the social networking mobile software application further having the features:
N. functions which allow end users to set custom colors for messages sent to specific recipients or received from specific senders, said functions including tap slider selection scales for mixing desired amounts of red, green and blue primary colors and means for saving the custom colors;
O. a plurality of default display screen themes and functions which allow end users to switch the default display screen themes by shaking the particular mobile device, wherein the messages, voice messages, video messages, profiles and ads recorded, sent or received by end users are associated to and interconnected with the end users' existing online social networks.

4. The method of claim 1 in which the social networking mobile software application further having the features:
P. functions which allow end users to highlight profiles, ads, text, voice and video messages sent and received based on their physical locations, said functions including assigning highlighted background colors, changing font sizes and styles.

5. A mobile, handheld device for communicating data including text, pictures, sound recordings and video recordings via social networking websites using wireless connections to the internet and cellular provider data network, the device comprising:
wireless connectivity to the internet through a cellular provider data network; and
a social networking mobile software application, the application including the following features:
A. an interface which allows end users to upload and view profiles of themselves on the particular mobile devices that contain visual contents while simultaneously hearing an audio description of their profile using streaming and intact multimedia file;
B. an interface which allows end users to compose, send, receive and view messages to and from an online social network from the mobile devices;
C. an interface which allows end users to record, send, receive and playback voice and video messages on the mobile devices to other users running the same social networking software application after the initiating user selects the other user's profile utilizing the mobile devices' microphone and speaker via a WiFi/cellular data path;
D. an interface which allows end users on the mobile devices to have a live conversation with each other, utilizing VoIP with a wireless internet connection or the cellular data path with VoIP after the initiating user selects on the other user's profile;
E. an interface which allows multiple end users to have a live conversation or pass voice messages on the mobile devices to other users using compatible mobile devices and social networking mobile software application, thereby multiple users forming a chat room by joining to the same social network;
F. an interface which allows end users to receive ads or profiles in the form of images or text while simultaneously listening to audio transferred to their wireless mobile device via a wireless connection to the internet or via the cellular provider's data network over the internet from a server or set of servers;
G. an interface which allows end users of multiple wireless devices to send and receive voice messages to each other by selecting their ad or profile utilizing a wireless connection over the internet, or via the cellular provider's data network;
H. an interface which allows end users to set custom colors for messages sent to specific recipients or received from specific senders, said means including tap slider selection scales for mixing desired amounts of red, green and blue primary colors and means for saving the custom colors; and
I. a plurality of default display screen themes and interface which allows end users to switch the default display screen themes by shaking the particular mobile device, wherein the messages, voice messages, video messages, profiles and ads recorded, sent or received by end users are associated to and interconnected with the end users' existing online social networks.

6. The mobile, handheld device of claim 5, wherein the social networking mobile software application further comprises one or more of the following optional features:
J. a graphical user interface display on the mobile handheld device of web pages of the online social network;
K. a graphical user interface display on the mobile handheld device of a friend's timeline in landscape view;
L. a graphical user interface display on the mobile handheld device of a record button for recording audio data;
M. a graphical user interface display on the mobile handheld device which allows a user to set custom color options for messages; and
N. a people picker graphical user interface display on the mobile handheld device that generates the people list from the currently selected or displayed timeline.

7. A social networking mobile software application operating on particular mobile devices, using wireless connections to the internet and cellular provider data network, the social networking mobile software application comprising:
A. means to obtain real time physical locations of the mobile devices and attach the physical locations obtained to end users' profiles;
B. means to allow end users to view profiles of themselves on the particular mobile devices that contain visual contents while simultaneously hearing an audio description of their profile using streaming and intact multimedia file;
C. means to allow end users to compose, send, receive and view text messages to and from an online social network on the particular mobile devices;
D. means to allow end users to record, send, receive and playback voice and video messages on the particular mobile devices to other users after the initiating user selects the other user's profile utilizing the particular mobile devices' microphone and speaker via a WiFi/cellular data path;
E. means to allow end users on particular mobile devices to have a live conversation with each other, utilizing VoIP with a wireless internet connection or the cellular data path with VoIP after the initiating user selects on the other user's profile;

F. means to allow multiple end users to have a live conversation or pass voice messages on the particular mobile devices to other users using compatible mobile devices and social networking mobile software application, thereby multiple users forming a chat room by joining to the same social network;

G. means to allow end users to receive ads or profiles in the form of images and text while simultaneously listening to audio transferred to their wireless device via a wireless connection to the internet or via the cellular provider's data network over the internet from a server or set of servers;

H. means to allow end users of multiple wireless devices to send and receive voice messages to each other by selecting their ad or profile utilizing a wireless connection over the internet, or via the cellular provider's data network;

I. means to allow end users to attach their physical locations to their text, voice and video messages at the time when said text, voice and video messages sent;

J. means to allow end users to set and assign custom colors for profiles, ads, text, voice and video messages sent and received, said functions including tap slider selection scales for mixing desired K. means to allow end users to sort profiles, ads, text, voice and video messages sent and received based on their physical locations;

L. means to allow end users to sort profiles, ads, text, voice and video messages sent and received based on each of their assigned customer colors;

M. means to allow end users to send and receive profiles, ads, text, voice and video messages and have live conversations with other end users based on their physical locations and their assigned customer colors; and N. means to send automatic alerts in the form of text, audio and video messages to end users in close physical proximity based on the physical locations attached to their profiles.

8. The social networking mobile software application of claim 7 in which the real time locations of end users' mobile devices obtained through the Global Positioning System, cellular tower triangulation, IP addresses, tv signals, FM radio signals and combinations thereof.

9. The social networking mobile software application of claim 7 further comprises:

O. means to allow end users to highlight profiles, ads, text, voice and video messages sent and received based on their physical locations, said functions including assigning highlighted background colors, changing font sizes and font styles of said profiles, ads, text, voice and video messages sent and received.

10. The social networking mobile software application of claim 7 in which the particular mobile devices are selected from the group of: smart phones, tablet computers, notebook computers, desk top personal computers, netbook computers and other handheld, wireless devices.

11. The social networking mobile software application of claim 7 in which the voice and video messages recorded, sent or received by the end users via the WiFi/cellular path utilized by the users' mobile computing device are encoded in an intact multi-media file format selected from the group consisting of VoIP, WAV, VOX, WMV, MOV, and 3GG.

12. The social networking mobile software application of claim 7 in which the cellular provider's data network includes but is not limited to 4G networks.

13. The social networking mobile software application of claim 7, in which the cellular provider's data network includes but is not limited to 4G networks, who send and receive messages to and from wireless devices directly.

14. The social networking mobile software application of claim 7 further comprising eCommerce software.

15. The social networking mobile software application of claim 7 further comprising:
means by which to allow screen displaying messages received from different accounts to be traversed by a "swiping gesture" on the particular mobile devices.

16. The social networking mobile software application of claim 7 further comprising:
means by which to allow screen displaying messages received from different accounts to be traversed by arrow keys on mechanical or virtual keyboards in the particular mobile devices.

17. The social networking mobile software application of claim 7 further comprising:
means by which to allow messages saved to existing contacts management applications in the mobile devices.

18. The social networking mobile software application of claim 7 further comprising: means by which to allow emailing messages originating from the social network.

19. The social networking mobile software application of claim 7 further comprising: means by which to allow integration with web browsing in the mobile devices, wherefrom displaying web pages, photos and playing video and audio recording.

20. The social networking mobile software application of claim 7 further comprising:
means to display in both portrait and landscape modes.

21. The social networking mobile software application of claim 7 in which end users can record, send, receive and playback voice and video messages on the particular mobile devices to other users running the same application.

* * * * *